United States Patent
Joshi et al.

(10) Patent No.: US 7,260,058 B1
(45) Date of Patent: Aug. 21, 2007

(54) TIMER BASED SYSTEM FOR PREVENTING MISMATCH IN AUTOMATIC PROTECTION SWITCHING

(75) Inventors: Aniruddha B. Joshi, Santa Clara, CA (US); Rahul Dasgupta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1020 days.

(21) Appl. No.: 10/310,436

(22) Filed: Dec. 4, 2002

(51) Int. Cl.
*H04J 1/16* (2006.01)

(52) U.S. Cl. .................. 370/217; 370/218; 370/219

(58) Field of Classification Search ............... 370/218, 370/217, 210, 220, 258, 535, 219; 398/92, 398/31
See application file for complete search history.

(56) References Cited

U.S. PATENT DOCUMENTS

| | | | |
|---|---|---|---|
| 6,275,510 B1 * | 8/2001 | Koenig et al. ............ 370/535 |
| 6,301,254 B1 | 10/2001 | Chan et al. ................ 370/397 |
| 6,421,318 B1 | 7/2002 | Coltro ...................... 370/223 |
| 6,728,489 B2 * | 4/2004 | Tomooka et al. ........... 398/92 |
| 2002/0141332 A1 * | 10/2002 | Barnard et al. ............ 370/218 |

* cited by examiner

*Primary Examiner*—Chi Pham
*Assistant Examiner*—Albert T. Chou
(74) *Attorney, Agent, or Firm*—Cindy Kaplan

(57) ABSTRACT

A method for resolving primary section mismatch at a local node coupled to a remote node with two working sections is disclosed. A first working section is initially identified as the primary section and a second working section is initially identified as the secondary section. The primary section supports network traffic and the secondary section operates as a backup for the primary section. The method includes receiving a status indication change of the working section identified as the primary section at the local node and switching the primary section to the second working section at the local node. A timer is started upon switching the primary section to the second working section at the local node and the primary section is switched back to the first working section at the local node after the timer expires if the other node has not switched its primary section.

20 Claims, 6 Drawing Sheets

TIMER BASED SYSTEM FOR PREVENTING MISMATCH IN AUTOMATIC PROTECTION SWITCHING

BACKGROUND OF THE INVENTION

The present invention relates generally to digital communication networks, and more specifically, to networking equipment possessing optical interfaces and conforming to the SONET/SDH standard. The invention provides a system and method for preventing primary section mismatch in Automatic Protection Switching (APS).

SONET/SDH and optical fiber have emerged as significant technologies for building large scale, high speed, Internet Protocol (IP) based networks. SONET and SDH are a set of related standards for synchronous data transmission over fiber optic networks. SONET is short for Synchronous Optical Network and SDH is an acronym for Synchronous Digital Hierarchy. A SONET system consists of switches, multiplexers, and repeaters, all connected by fiber. Switches and other components within the SONET/SDH system are configured to have multiple cable connections. For example, nodes are typically connected by at least two lines to provide a backup path.

Automatic Protection Switching is a means to provide SONET/SDH line redundancy. It is described in ITU-T Recommendation G.783 ("Characteristics of Synchronous Digital Hierarchy (SDH) Equipment Functional Blocks", dated April 1997) and Bellcore GR-253 standard. AnnexB of the ITU-T Recommendation G.783 dated April 1997 describes a multiplex section protection optimized protocol. The protocol provides high availability through SONET line redundancy by switching between two working sections to provide bidirectional non-revertive protection switching. The protocol uses the concept of primary and secondary sections (similar to working and protection lines of Bellcore GR-253 APS) to indicate which working section is carrying traffic. The section that carries traffic when no switch is active is called the primary section (similar to working line) and the other working section (similar to protection line) is called the secondary section. The APS operation switches between the two working sections to realize 1+1 bidirectional non-revertive protection switching. The protocol is exchanged over the K1/K2 bytes in the SONET/SDH frame. Thus, in AnnexB APS, the protection line indication (i.e., primary or secondary) can change between the working sections. This can lead to a situation where APS Line Terminating Equipment (LTE) at different ends indicate different working sections as primary, resulting in primary section mismatch.

According to the Annex B APS protocol, when an APS node moves its primary section from a first working section to a second working section, it expects the remote node to also move to its primary section to the second section. In the event that the two nodes disagree about which section is primary (i.e., one node indicates section one in its APS protocol byte K2 and the other node indicates section two), the node that believed section two was primary changes so that section one is primary and sets its state according to local line conditions and the incoming K2 bytes. The protocol, however, does not specify how much time the side that has switched to the second working section as primary should wait before going back to section one as primary.

With conventional systems, if the remote node does not follow by switching to section two as its primary, and instead continues to indicate that section one is the primary section, the local node continues to wait for the remote node to indicate the new primary section indication in the updated K1/K2 bytes. This may take a long time to happen, or may not happen at all. The same situation may occur after clearing of a user initiated forced switch request. If the remote node is delayed in sending indication about its primary section or is delayed in moving to the other section, the local node which switched to section two will continue to wait for an indication that may or may not arrive, resulting in a primary section mismatch.

For example, if a Signal Fail condition occurs on the primary section, the local and remote selectors both change to working section two as the active line (with primary section still defined as working section one). After the Signal Fail condition clears and a Wait-To-Restore timer fires, the local node changes its K1 byte and sends a No Request on it. The local node will then switch its primary section to working section two. This is reflected in the K2 byte. If the remote node fails to send back a No Request on its K1 byte and continues to indicate working section one as its primary section, the local node will continue to wait for the remote node to switch to working section two, thus resulting in a primary section mismatch.

There is, therefore, a need for a timer based system to resolve primary section mismatch such that a local node switches its primary section indication back to the first working section to resolve a mismatch due to a remote node not switching its primary section to the second working section within a specified period of time.

SUMMARY OF THE INVENTION

A method and system for resolving primary section mismatch at an APS node coupled to another computer node with a first working section and a second working section are disclosed. The method generally includes identifying the first working section as a primary section and the second working section as a secondary section. The primary section supports network traffic and the secondary section operates as a backup for the primary section. The method further includes receiving a status indication change of the primary section at the APS node and switching the first working section and the second working section such that the first working section is identified as the secondary section and the second working section is identified as the primary section at the APS node. A timer is started upon switching of the primary section to the second working section at the APS node and the primary section is switched back to the first working section at the APS node after the timer expires if the other node has not switched the primary section to the second working section.

A computer program product for resolving primary section mismatch for automatic protection switching between two computer network nodes connected with a first working section and a second working section generally comprises code that identifies the first working section as a primary section and the second working section as a secondary section at each of the nodes and receives a status indication change of the primary section at one of the nodes. The product further includes code that switches the first working section and the second working sections such that the first working section is the secondary section and the second working section is the primary section at the node receiving the status indication change. The product further includes code that starts a timer and switches the primary section back to the first working section at the node receiving the status indication change, after the timer expires if the other node has not switched its primary section to the second working section. A computer-readable storage medium is provided for storing the codes.

A system for resolving primary section mismatch for automatic protection switching between two computer network nodes connected with two working sections generally comprises a timer mechanism configured to start a timeout period upon receiving a status change indication that the node has switched the primary section from one of the working sections to the other of the working sections and a processor located at the node having the timer. The processor is operable to receive a status indication change of the working section identified as the primary section, switch the primary section to the other working section and at completion of the timeout period, switch the primary section back to the initial working section if the other node has not switched its primary section to the other working section.

In another aspect of the invention, a method generally comprises receiving a status indication change of the working section identified as the primary section at a local node and switching the primary section to the other working section at the local node. A timer is started upon switching the primary section at the local node and the primary section is switched back to the initial working section at the local node after the timer expires if the other node has not switched its primary section to the other working section.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The invention operates in the context of a data communication network including multiple network elements. Some of the nodes in a network that employs the present invention may be network devices such as routers and switches. Some of the nodes may be, for example, suitably configured switches such as those available from Cisco Systems, Inc. of San Jose, Calif. (e.g., MGX8850 Multiservice Wide-Area Edge Switch.

Figure 1:
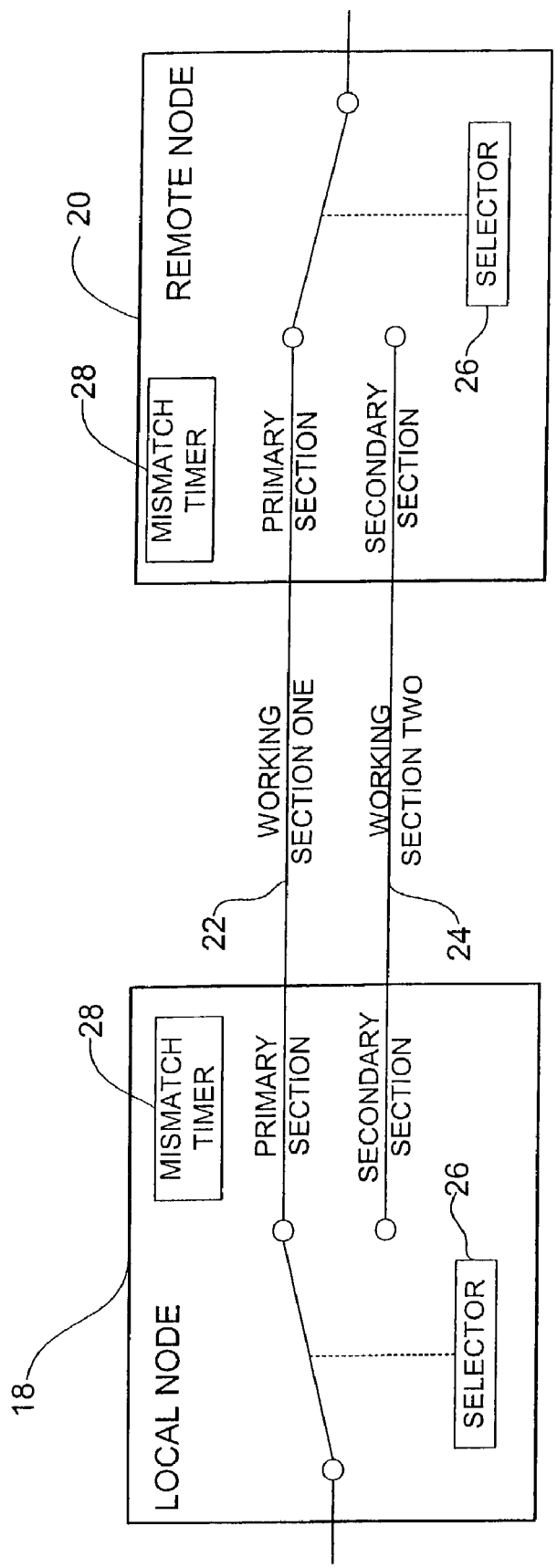
FIG. 1 is a schematic illustrating two nodes of an APS system transmitting data over a first working section with both nodes identifying the first working section as the primary section.

Referring now to the drawings, and first to FIG. 1, a schematic illustrating a timer based technique to prevent primary section mismatch in APS is shown. Local node 18 and remote node 20 are shown connected by working section one 22 and working section two 24. The nodes may be LTE (Line Terminating Equipment), for example. The section that carries traffic when no switch is active is called the primary section and the other working section is called the secondary section and provides protection for the primary section. Selectors 26 are provided to select traffic from either of the working sections depending upon the existing state of the working sections and the primary section indication. The selector 26 is on the primary section in the absence of a switch request. All switch requests are for a switch from the primary section to the secondary section. Once a switch request clears, traffic is maintained on the section to which it was switched by making that section the primary section. The traffic is bridged to both working section one 22 and working section two 24.

Figure 2:
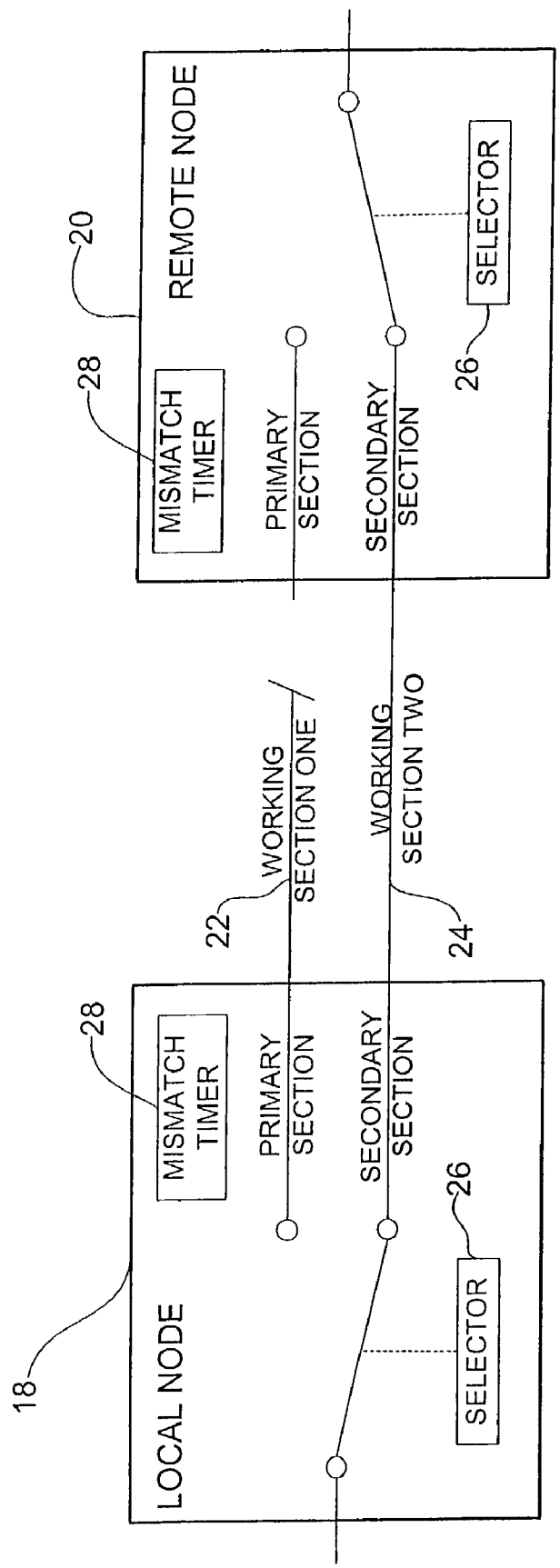
FIG. 2 is the system of FIG. 1 after a failure has occurred in the first working section and both nodes have switched traffic to a second working section, and before either node has changed its primary section.
Figure 3:
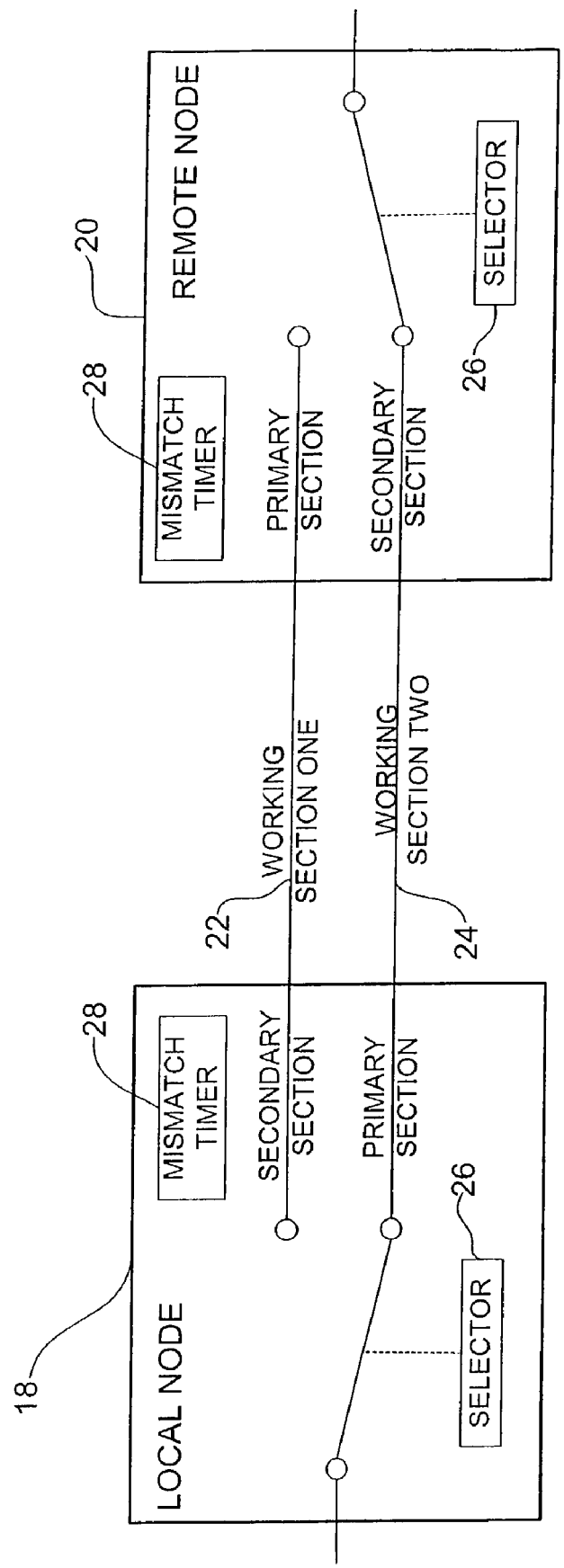
FIG. 3 is the system of FIG. 2 after a local node has changed its primary section to the second working section after fault has cleared.
Figure 4:
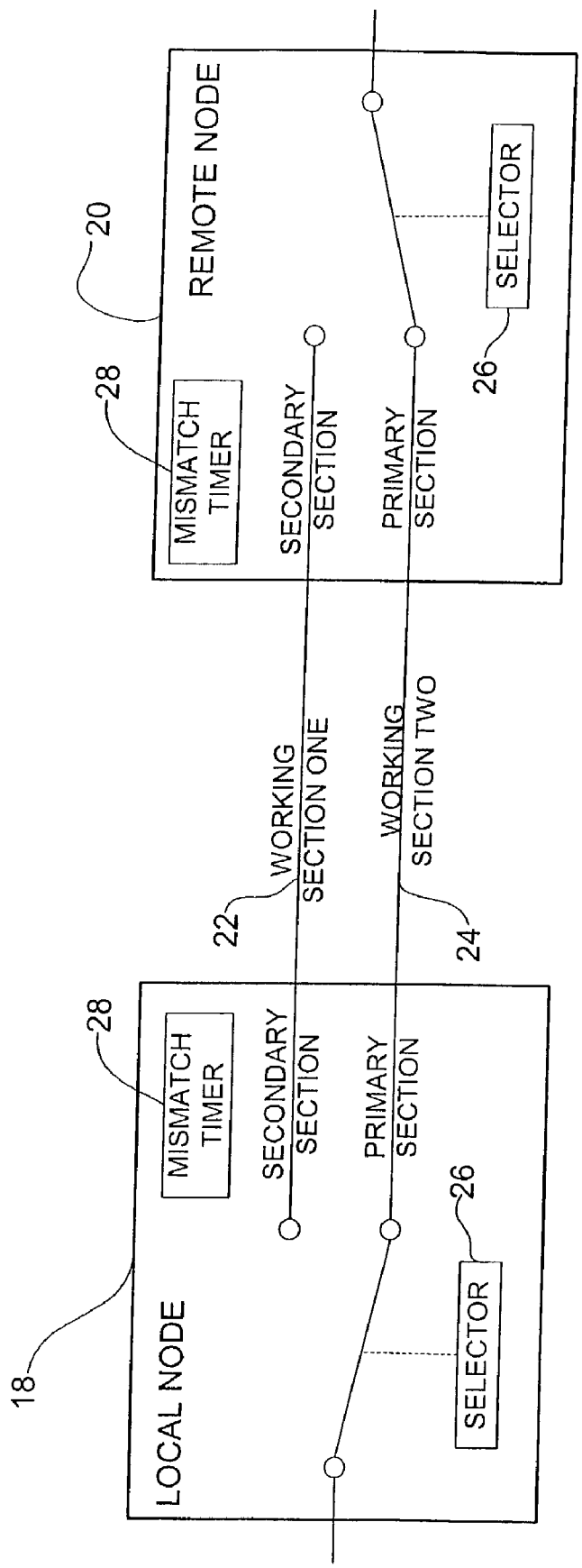
FIG. 4 is the system of FIG. 3 after both nodes have changed their primary section to the second working section after fault has cleared.

FIGS. 1-4 illustrate local and remote nodes 18, 20 in different operation modes. FIG. 1 illustrates both nodes 18, 20 with working section one 22 as their primary section and working section two 24 as their secondary section. Network traffic is routed over working section one 22. Upon receiving a failure indication on working section one 22, traffic is routed on working section two 24 (FIG. 2). After the failure has cleared, a timer is also started to ensure that it was not a transient failure. After the timer has expired, local node 18 switches its primary section to working section two 24 (FIG. 3). If the remote node 20 switches its primary section to working section two 24, as shown in FIG. 4, there is no primary section mismatch. However, if the remote node 20 fails to switch its primary section to working section two 24, there is a primary section mismatch between the two nodes 18, 20. This may occur, for example, when local node 18 switches to working section two 24 as a result of a defect clearing event but the remote node 20 does not switch to working section two 24. In this case, there is a primary section mismatch condition with each node 18, 20 indicating different working sections as the primary section.

In order to resolve the primary section mismatch, a timer mechanism 28 is provided. The mismatch timer is started when selector at the APS 18 node moves its primary section indication from working section one to working section two. Node 18 switches back to working section one if the remote APS node 20 does not switch its primary section indication to working section two. If the remote APS node 20 does not switch its primary to working section two after the timer 28 expires, the local node switches back to working section one 22 to resolve the mismatch within a specified period of time. The mismatch timer is located on both nodes 18, 20. However, the timer is triggered only on the node that changes its primary section indication from first working section to the second working section.

Every time the APS node 18 switches to make working section two 24 the primary section, the timer 28 is started with a finite timeout period. The timeout period may be, for example, equivalent to time taken to declare a failure or alarm. In one embodiment, the timer 28 is preferably set at a time interval of less than 50 ms, for example. It is to be understood that the timer 28 may be preset at any time interval or may be configurable by the user.

Initiation of the switching of the primary section from the first working to the second working section (or from the second working section to the first working section) may be caused by any type of status indication change on the first working section (or the second working section) including, but not limited to, failure signal, forced switch, or manual switch.

Information such as requests and acknowledgements is exchanged between the two nodes 18, 20 through K1/K2 bytes. The APS protocol bytes K1 and K2 are exchanged to complete a switch. The K1 byte indicates a request for switch action. Byte K2 indicates the number of the section which carries the traffic when no switch is active. The section number on byte K2 is changed after a switch has cleared. Clearing of a switch is completed when both the receive end switches select the other working section as primary and receive no request. K1/K2 bytes are preferably sent on both sections 22, 24 to provide for successful clearing operations and to allow recovery of the primary channel mismatch condition.

Bits 1-4 of the K1 byte indicate the type of request. A request may be a condition (e.g., Signal Fail (SF) or Signal Degrade (SD)) associated with the primary section. Conditions are typically not indicated for the secondary section. A request may also be a state (Wait to Restore, No Request, Reverse Request) of the MSP function. The switch action request may also be an external request (e.g., forced switch) to switch from the primary to the secondary line. Bits 5-8 of the K1 byte indicate the number of the section to be protected by the switch. The K2 byte indicates the selector position in bits 1-4 (e.g., 1 if section one is working, 2 if section two is working). The section working as primary section is thus indicated by the K2 byte.

Figure 5:
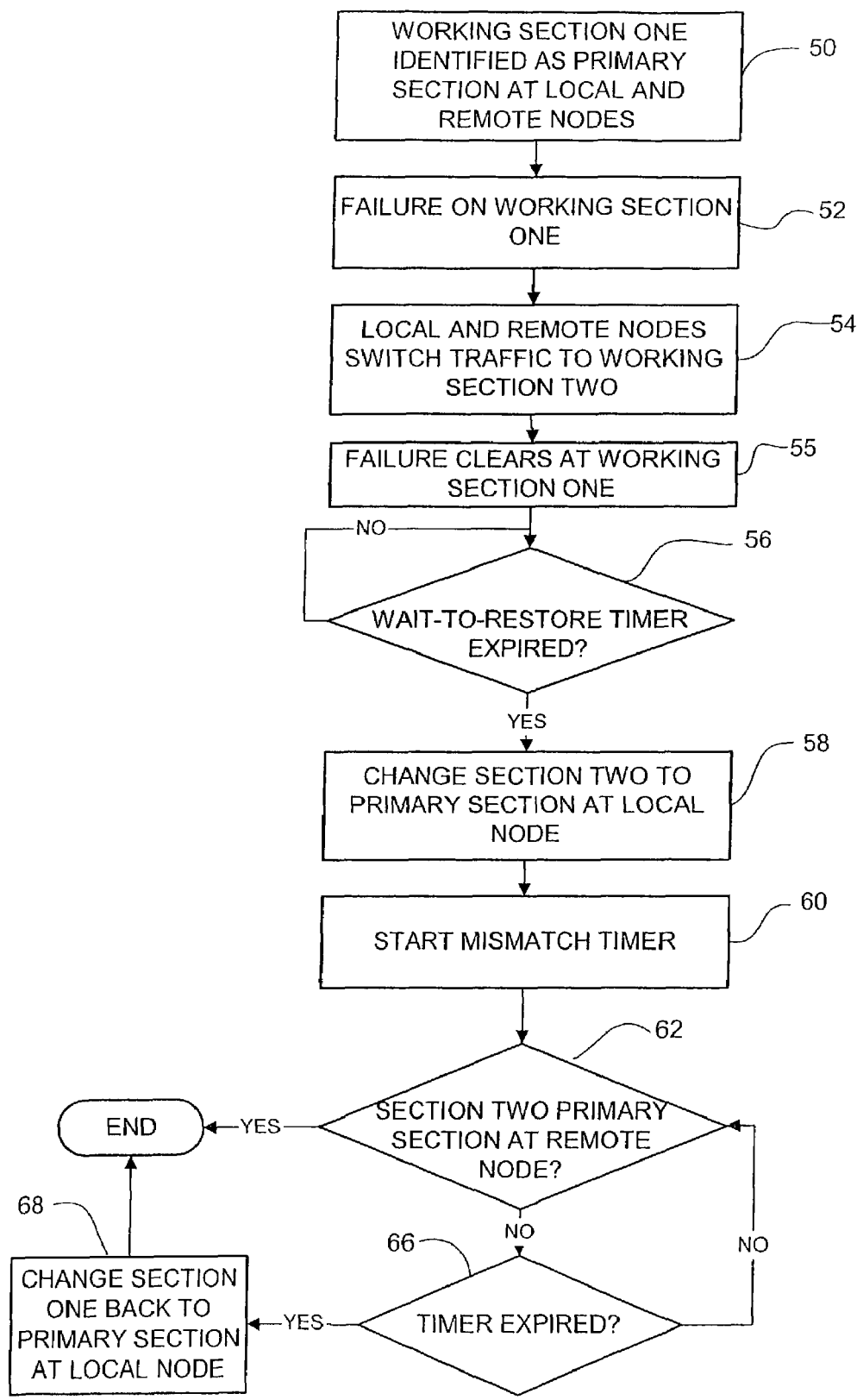
FIG. 5 is a flowchart illustrating a process for resolving primary section mismatch in automatic protection switching.

FIG. 5 is a flowchart illustrating an example of a signal failure on working section one 22 followed by a mismatch between the local and remote nodes 18, 20, and a resolution of the mismatch. Before the failure, local node 18 and remote node 20 both have working section one 22 identified as the primary section (step 50) (FIG. 1). At step 52 a failure occurs on working section one 22. When the fault condition occurs, both ends select traffic from working section two 24 by virtue of the bidirectional operation (step 54) (FIG. 2). The fault may clear (step 55), in which case the local node 18 generates a Wait to Restore request and starts a timer. After the timer expires, the local node 18 switches to section two as the primary and indicates this by updating its K2 byte (steps 56 and 58) (FIG. 3).

When the local node 18 changes its primary section to working section two 24, the mismatch timer 28 is started (step 60). If the remote node 20 switches to working section two 24 as the primary section within this time (indicated to local node 18 by updated K1/K2 bytes from remote node 20), then the timer 28 is cancelled (step 62) (FIG. 4). If the remote node 20 does not switch to working section two 24 as the primary section, the local node 18 switches back to working section one 22 as the primary section when the timer expires (steps 66 and 68). This results in both nodes 18, 20 indicating the same primary section after the timer expires.

The above described process thus solves the previously described mismatch problem while satisfying ITU-T G.783 requirements.

Figure 6:
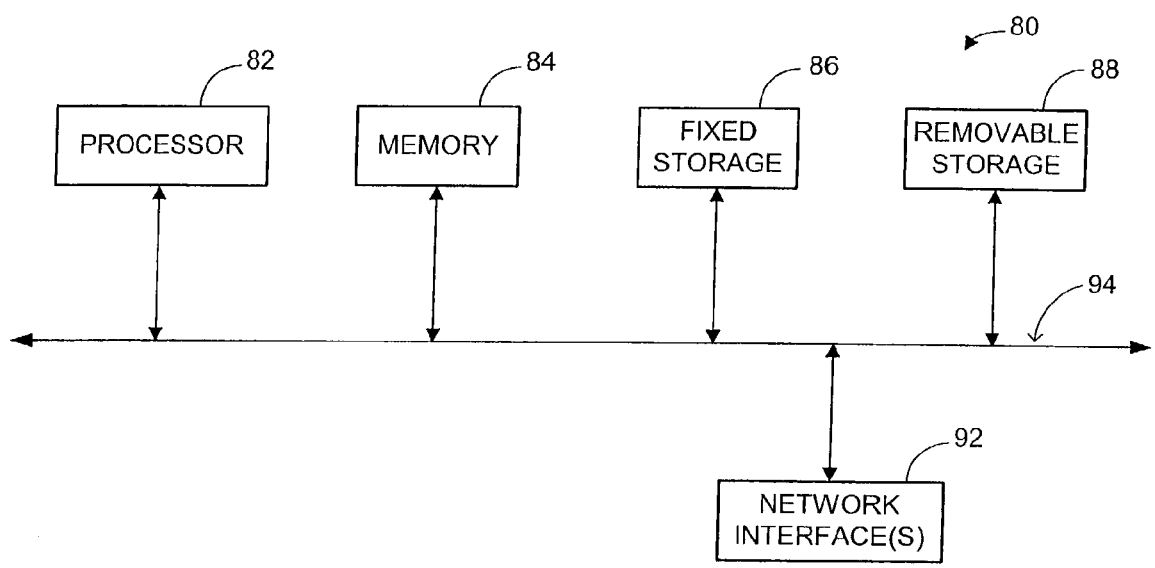
FIG. 6 is a system block diagram of a computer system that can be utilized to execute software of an embodiment of the present invention.

FIG. 6 shows a system block diagram of computer system 80 that may be used to execute software of an embodiment of the invention. The computer system 80 includes memory 84 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 80 further includes subsystems such as a central processor 82, fixed storage 86 (e.g., hard drive), removable storage 88 (e.g., CD-ROM drive), and one or more network interfaces 92. Other computer systems suitable for use with the invention may include additional or fewer subsystems. For example, computer system 80 may include more than one processor 82 (i.e., a multi-processor system) or a cache memory. The computer system 80 may also include a display, keyboard, and mouse (not shown) for use as a host.

The system bus architecture of computer system 80 is represented by arrows 94 in FIG. 6. However, these arrows are only illustrative of one possible interconnection scheme serving to link the subsystems. For example, a local bus may be utilized to connect the central processor 82 to the system memory 84. Computer system 80 shown in FIG. 6 is only one example of a computer system suitable for use with the invention. Other computer architectures having different configurations of subsystems may also be utilized. Communication between computers within the network is made possible with the use of communication protocols, which govern how computers exchange information over a network. It is to be understood that the system may also be implemented in hardware.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for resolving primary section mismatch at an APS node coupled to another computer node with a first working section and a second working section, the method comprising:

identifying the first working section as a primary section and the second working section as a secondary section, the primary section supporting network traffic and the secondary section operating as a backup for the primary section;

receiving a status indication change of the working section identified as the primary section at the APS node;

switching the primary and secondary sections at the APS node, such that the first working section is identified as the secondary section and the second working section is identified as the primary section;

starting a timer upon switching of the primary section to the second working section at the APS node; and switching the primary section back to the first working section at the APS node after the timer expires if the other node has not switched its primary section to the second working section.

2. The method of claim 1 wherein the status indication change is a signal fail condition in the primary section.

3. The method of claim 1 wherein the status indication change is a forced switch and corresponding clear.

4. The method of claim 1 wherein the status indication change is a clearing of a signal fail condition.

5. The method of claim 1 further comprising switching network traffic to the second working section upon receiving the status indication change.

6. The method of claim 1 wherein the timer is user configurable.

7. The method of claim 1 wherein the timer is configured with a timeout period of less than approximately 50 ms.

8. A computer-readable medium storing computer-executable instructions for resolving primary section mismatch for automatic protection switching between two computer network nodes connected with a first working section and a second working section, the instructions when executed cause a computer to identify the first working section as a primary section and the second working section as a secondary section, the primary section supporting network traffic and the secondary section operating as a backup for the primary section;

receive a status indication change of the working section identified as the primary section at one of the nodes;

switch the primary and secondary working sections at the node receiving the status indication change, such that the first working section is the secondary section and the second working section is the primary section;

start a timer; and switch the primary section back to the first working section at the node receiving the status indication change, after the timer expires if the other node has not switched its primary section to the second working section.

9. The computer-readable medium of claim 8 wherein the timer is user configurable.

10. The computer-readable medium of claim 8 wherein the timer is configured with timeout period of less than approximately 50 ms.

11. A system for resolving primary section mismatch for automatic protection switching between two computer network nodes connected with two working sections, one of the working sections initially identified as a primary section and the other of the working sections initially identified as a secondary section, the system comprising:

a timer located at one of the nodes and configured to start a timeout period upon receiving a status change indication that the node has switched its primary section from one of the working sections to the other of the working sections; and a processor located at the node having the timer and operated to switch the primary section to the other working section and, at completion of the timeout period, switch the primary section back to the initial working section if the other node has not switched its primary section to the other working section.

12. The system of claim 11 wherein the timer is user configurable.

13. A method for resolving primary section mismatch at a local node coupled to a remote node with two working sections, one of the working sections initially identified as the primary section and the other working section initially identified as the secondary section, the primary section supporting network traffic and the secondary section operating as a backup for the primary section, the method comprising:

receiving a status indication change of the working section identified as the primary section at the local node;

switching the primary section to the other working section at the local node;

starting a timer upon switching the primary section at the local node; and switching the primary section back to the initial working section at the local node after the timer expires if the other node has not switched its primary section to the other working section.

14. The method of claim 13 wherein the status indication change is a signal fail condition in the primary section.

15. The method of claim 13 wherein the status indication change is a forced switch and corresponding clear.

16. The method of claim 13 wherein the status indication change is a clearing of a signal fail condition.

17. The method of claim 13 further comprising switching network traffic to the backup section upon receiving the status indication change.

18. The method of claim 13 wherein the timer is user configurable.

19. The method of claim 13 wherein the timer is configured with a timeout period of less than approximately 50 ms.

20. The method of claim 1 further comprising determining if the other node has switched its primary section to the second working section by examining a K2 byte received from the other node upon expiration of the timer.

* * * * *